United States Patent
van Waes et al.

(10) Patent No.: US 12,371,585 B2
(45) Date of Patent: Jul. 29, 2025

(54) BIO-BASED COATING COMPOSITIONS AND METHODS OF PREPARATION THEREOF

(71) Applicant: Kraton Chemical, LLC, Jacksonville, FL (US)

(72) Inventors: Patrick van Waes, Almere (NL); Michael Bulanov, Almere (NL)

(73) Assignee: Kraton Chemical LLC, Jacksonville, FL (US)

( * ) Notice: Subject to any disclaimer, the term of this patent is extended or adjusted under 35 U.S.C. 154(b) by 585 days.

(21) Appl. No.: 17/929,780

(22) Filed: Sep. 6, 2022

(65) Prior Publication Data
US 2023/0069931 A1 Mar. 9, 2023

Related U.S. Application Data

(60) Provisional application No. 63/260,999, filed on Sep. 8, 2021.

(51) Int. Cl.
*C09D 133/08* (2006.01)
*C09D 175/06* (2006.01)

(52) U.S. Cl.
CPC ......... *C09D 133/08* (2013.01); *C09D 175/06* (2013.01)

(58) Field of Classification Search
CPC .......................... C09D 133/08; C09D 175/06
USPC ....................................................... 524/457
See application file for complete search history.

(56) References Cited

U.S. PATENT DOCUMENTS

2009/0209690 A1   8/2009   Sandstrom
2021/0009844 A1*  1/2021   Wu ......................... C08K 5/10

FOREIGN PATENT DOCUMENTS

CN   107141927 A    9/2017
WO   2018146142 A1  8/2018

* cited by examiner

*Primary Examiner* — Kelechi C Egwim

(57) ABSTRACT

The disclosure relates to a coating composition comprising a decarboxylated rosin acid (DCR) component as a coalescent agent, for use in a dispersion base comprising any of acrylic and/or polyurethane, and optional additives. The coating composition forms a continuous and homogeneous film even under humidity conditions. The DCR has a density of 0.9 to 1.0 g/cm$^3$, a flash point of 135 to 175° C., an acid value of <50 mg KOH/g, measured according to ASTM D465, and a viscosity of 15 to 60 cSt at 40° C., measured according to ASTM D-445.

20 Claims, No Drawings

BIO-BASED COATING COMPOSITIONS AND METHODS OF PREPARATION THEREOF

RELATED APPLICATIONS

This application claims priority from U.S. Provisional Application No. 63/260,999 with a filing date of Sep. 8, 2021, the disclosure of which is incorporated herein by reference.

FIELD

The disclosure relates to a bio-based coating composition comprising dispersions, methods of preparation, and applications thereof.

BACKGROUND

Acrylic and/or polyurethane dispersions have been widely used in coating applications, as separate components or as a mixture. There is an ongoing demand to provide coating composition with an excellent balance of properties, e.g., good dispersion, stability of the components, good chemical and solvent resistance, facile film formation (i.e., low minimum film forming temperature MFT, preferably ambient temperature or below), good hardness, and blocking resistance to coatings.

In some coating compositions, coalescing agents are added to act as a solvent and/or a plasticizer to the polymeric phase of paints, varnishes, and adhesive formulations, lowering the Tg and favoring the formation of continuous and homogeneous films at a certain temperature and humidity conditions. A typical paint formulation contains between 0.1-10% coalescing agents.

There is a still need for improved coating compositions with coalescing agents that are bio-based, having low volatile organic compounds (VOCs), low odor and phthalate-free.

SUMMARY

In one aspect, a coating composition comprising: 10-90 wt. % of a dispersion polymer selected from acrylic polymers, polyurethane polymers, and mixtures thereof; 2-20 wt. % of a decarboxylated rosin acid (DCR) having a density of 0.9 to 1.0 g/cm$^3$, a flash point of 135 to 175° C., an acid value of <50 mg KOH/g, measured according to ASTM D465, and a viscosity of 15 to 60 cSt at 40° C., measured according to ASTM D-445; 0-70 wt. % of at least one of a filler, pigment and combinations thereof. The coating composition forms a film upon coating a substrate, and wherein the film has an average thickness of 10 μm to 200 μm and a minimum film formation temperature (MFFT) from −5 to 60° C., measured according to ASTM D2354.

In another aspect, the coating composition comprising a DCR having one or more C═C groups; and 40 to 100 wt. % of tricyclic compounds having 18 to 20 carbon atoms. In other aspects, the DCR having an aromatic content of 30-60 wt. %, a naphthenic content of 40-60 wt. %, and a paraffinic content of 20-35 wt. %, based on the total weight of the DCR.

In yet another aspect, the coating composition comprising the dispersion polymer based on acrylic copolymer. The acrylic copolymer comprising mixture of monomers having, 20 to 80% by weight of one or more acrylic and/or methacrylic acid esters, whose homopolymer(s) have a glass transition temperature, Tg, greater than 25° C. and 19 to 79% by weight of one or more acrylic and/or methacrylic acid esters whose homopolymer(s) have a glass transition temperature, Tg, less than 25° C.

In yet another aspect, the coating composition comprising dispersion based on polyurethane polymer, the polyurethane is a reaction product of a polyisocyanate containing isocyanate-reactive groups and a polyol. The polyisocyanate is selected from aliphatic diisocyanates include hexamethylene diisocyanate, isophorone diisocyanate, cyclohexane-1,4 diisocyanate, 4,4'-dicyclohexylmethane diisocyanate, trimethyl-1,6 diisocyanatohexane, and m-tetramethylxylene diisocyanate.

DESCRIPTION

The following terms will be used throughout the specification.

"Coating" refers to a covering that is applied to a substrate, or surface of an object.

"Coalescent Agents" Refers to a Composition Use to Reduce the Minimum Film Formation Temperature (MFFT) of Paints, Inks, Other Coating Compositions, and the Like.

"Minimum film formation temperature" (MFFT) refers to the lowest temperature at which a latex, emulsion, or adhesive will uniformly coalesce when laid on a substrate as a thin film.

"Bio-based" refers to products wholly or partly derived from biomass, e.g., plants, trees, vegetables, animals, etc.

"Curable" refers to the capability of a compound to undergo one or more chemical reactions to form stable, covalent bonds among the constituent components.

"Phthalate-free" compositions refer to compositions wherein phthalate is not intentionally added, having <0.1 wt. %, or <0.05 wt. %, or <0.01 wt. % phthalate present.

"Dispersion" refers to a special form of a colloid, e.g., very fine particles dispersed in a continuous medium.

"VOC" refers to the volatile organic compound ("VOC") content in a liquid coating composition.

"Hydrocarbon" refers to organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. They can be straight, branched, or cyclic.

The disclosure relates to a coating composition comprising a decarboxylated rosin acid (DCR) component as a coalescent agent, for use in a dispersion base comprising at least one of acrylic and/or polyurethane compounds, and optional additives. The coating composition forms a continuous and homogeneous film even under humid conditions.

Decarboxylated Rosin Acid (DCR): The DCR is a rosin-derived composition obtained by decarboxylating a rosin acid, or by dimerizing and decarboxylating a rosin acid and separating/removing the dimerized species. The DCR is in the form of a liquid, and can be any of a crude DCR, a distilled or purified DCR, or mixtures thereof. The DCR can be hydrogenated and/or functionalized. Crude DCR is DCR containing 5-25 wt. % of higher molecular weight (450-1500 Da) components, e.g., hydrocarbons, oligomers, polymers, impurities, or dimer/trimer of fatty acids. Distilled or purified DCR refers to crude DCR having heavy fractions removed to improve color, reduce sulfur, etc.

The DCR is produced by the decomposition of rosin acids at high temperatures, e.g., 220-300° C. Rosin acids are normally solid, having a softening point of, e.g., 65-85° C.

The rosin acid can be fully decarboxylated forming DCR. The rosin acid can be partially decarboxylated, forming DCR, which is a mixture of molecules, some of which contain monocarboxylic acids having a general molecular formula, e.g., $C_{20}H_{30}O_2$.

In embodiments, the DCR comprises one or more C=C groups, 40-100 wt. % of tricyclic compounds having 18-20 carbon atoms, 0-30 wt. % of components with <19 carbon atoms, and 40-100 wt. % of components with a molecular formula in the range from $C_{19}H_{20}$ to $C_{19}H_{34}$, based on the total weight of the DCR.

In embodiments, the DCR is characterized as having a m/z (mass/charge) value in the range of 220-280, or 230-270, or 234-262, or 235-265, or >230, or <265, measured by GC-FID-MS.

In embodiments, the DCR is characterized as having an oxygen content of <5%, or <3%, or <2%, or 0-1%. The oxygen content (in %) can be calculated as oxygen to carbon ratio, or the sum of oxygen atoms present divided by sum of carbon atoms present, with the number of oxygen and carbon atoms being obtained from elemental analyses.

In embodiments, sum of tricyclic compounds as aromatic and cycloaliphatic in the DCR is >50 wt. %, or >55 wt. %, or >60 wt. %, or >74 wt. %, or >90 wt. %, or up to 100 wt. %, of total weight of the DCR. Aromatic DCR is defined as DCR species having a MW of 252-256, with MW of 254 as having a reactive double bond, and cycloaliphatic DCR is defined as DCR species having a MW of 260 or 262.

In embodiments, the amount of cycloaliphatic DCR is >15 wt. %, or >20 wt. %, or >30 wt. %, or >40 wt. %, or >50 wt. %, or >80 wt. %, based on the total weight of the DCR.

In embodiments, total amount of tricyclic compounds having reactive double bond (C=C group) is 1-45 wt. %, or <40 wt. %, or <30 wt. %, or <20 wt. %, or <15 wt. %, or <10 wt. % of total weight of the DCR. Reactive C=C group is defined as DCR species having a MW of 254 or 258.

In embodiments, the DCR is characterized as having a lower acid value (carboxylic acid content) than the rosin acid feedstock for making the DCR. In embodiments, the DCR has an acid value of <50, or <45, or <40, or <35, or <30, or <25, or <20, or <15, or <10, or <7, or <5, or 0.5-40, or 0.5-30, or 0.5-20, or 1-20, or 1-15, or 1-15, 1-10 mg/KOH, as measured using ASTM D1240-14 (2018) or ASTM D465.

In embodiments, the DCR has a density of 0.9-1.0, or 0.91-0.99, or 0.92-0.98, or 0.93-0.97, or 0.94-0.96, or >0.9, or <1.1 g/cm³.

In embodiments, the DCR is characterized as having viscosities comparable to those of petrochemical base oils, due in part to its relatively high molecular weights, for example, a viscosity of 15-60, or 18-55, or 20-50, or 22-48, or 25-45, or 28-42, or 30-40, or >20, or >25, or >28, or <45, or <50 cSt according to ASTM D-445, measured at 40° C.

In embodiments, the DCR has an aniline point of 3-40° C., or 5-40° C., or 5-30° C., or 5-25° C., or 2-20° C., or 5-20° C., or 5-15° C., or <25° C., or <20° C., or >3° C., or >5° C., or >8° C., according to ASTM D611.

In embodiments, the DCR has a pour point of −40 to +10° C., or −35 to +8° C., −30 to +5° C., or −30 to +0° C., or −30 to −5° C., or −28 to 0° C. or −28 to −5° C., or −28 to −10° C., or >−30° C., or >−28° C., or <+5° C., according to ASTM D97.

In embodiments, the DCR has a flash point of 135-175° C., or 135-165° C., or 135-160° C., or 140-175° C., or 140-160° C., or 140-158° C., or 140-155° C., or >135° C., or >140° C., or <175° C., or <165° C., or <160° C., according to ASTM D92.

In embodiments, the DCR has a boiling point of 200-390° C., or 210-390° C., or 235-390° C., or 280-380° C., or 290-370° C., 300-360° C., or >290° C., or >230° C., >210° C., or <400° C., or <370° C., measured according to D2887.

In embodiments, the DCR has a Gardner Color of 0-12.0, or 0.5-12.0, or 0.8-12.0, or 0.9-11, or 1.0-10.0, or 1.0-6.0, or 1.0-5, or >0, or >1.0, or >1.2, or <10.0, or <7.0, or <6.0, or <5.0, or <2.4, or <3.0, according to ASTM D6166.

In embodiments, the DCR has a sulfur content of <500 ppm (0.05 wt. %), or <300 ppm (0.03 wt. %), or <200 ppm (0.02 wt. %), or <100 ppm (0.01 wt. %), or <10 ppm (0.001 wt. %), or 20-700 ppm (0.002-0.7 wt. %), 30-500 ppm (0.003-0.5 wt. %), or 40-400 ppm (0.004-0.4 wt. %), or 40-300 ppm (0.004-0.3 wt. %), or 40-200 ppm (0.004-0.2 wt. %), based on the total weight of the DCR, measured according to ASTM D5453.

In embodiments, the DCR has a VOC of <5, or <4.75, or <4.5, or <4.25, or <4.0, or <3.75, or <3.5, or <3.25, or <3.0, or <2.75, or <2.5, or <2.25, or <2.0, or <1.5, or <1.0, or <0.5 wt. %, based on the total weight of the DCR. The VOC of the DCR is measured according to methods: i) summing the percent by weight contribution from all VOCs present in the product at 0.01% or more, or ii) according to the EPA (Environmental Protection Agency) method 24 or equivalent.

In embodiments, the DCR has a Kb (Kauri butanol) value of 25-90, or 30-85, or 35-80, or 40-75, or 45-70, or 50-65, or >40, or >50, or >60, or >70, or >80, according to ASTM D1133.

In embodiments, the DCR has a viscosity index of <−100, or <−110, or <−115, or <−120, measured according to ASTM D2270. The viscosity index is an arbitrary, unit-less measure of a fluid's change in viscosity relative to temperature change, for example, index of viscosity at 40° C. and viscosity at 100° C.

In embodiments, the DCR has a δD value of 14-18, or 14.2-17.8, or 14.5-17.5, or 15-17, or 15.2-16.5; a δP value of 3-6, or 3.2-5.5, or 3.4-5.2, or 3.5-5.0; and δH value of 7-10, or 7.5-9.5, or 8-9, or 8.2-8.8.

In embodiments, the DCR has a surface tension of 25-50, or 28-45, or 30-40 dynes/cm, according to ASTM D1331.

In embodiments, the amount of DCR in the coating composition ranges from 1-40 wt. %, or 2-35 wt. %, or 5-25 wt. %, or 7-20 wt. %, or >2 wt. %, or <30 wt. %, based on the total weight of the coating composition.

Dispersion Component: The coating composition comprises at least a dispersion base or medium, selected from acrylate compounds, urethane compounds, and mixtures thereof.

In embodiments, the dispersion base is an acrylic dispersion, selected from polyacrylates, polymethacrylates, and mixtures thereof. In embodiments, the acrylic dispersion comprises a blend of high Tg (>25° C.) monomer and low Tg (<25° C.) monomer, with the high Tg monomer comprising 20-80 wt. %, or 25-75 wt. %, or 30-70 wt. % of the acrylic blend; and the remainder the low Tg monomer.

The high Tg monomer can be, any acrylic or methacrylic acid ester which, when polymerized, gives a homopolymer having a Tg value >25° C., or >40° C., or >50° C. Examples of suitable esters include isobornyl acrylate, isobornyl methacrylate, methyl methacrylate, ethyl methacrylate, isopropyl methacrylate, isobutyl methacrylate, tert-butyl methacrylate, tert-butyl acrylate, n-propyl methacrylate, isobutyl methacrylate, and cyclohexyl methacrylate.

The low Tg monomer can be any acrylic or methacrylic acid ester which, when polymerized, gives a homopolymer having a Tg value of <25° C., or <0° C. Examples of suitable esters include methyl acrylate, ethyl acrylate, n-propyl acrylate, isopropyl acrylate, n-butyl methacrylate, n-butyl acrylate, isobutyl acrylate, 1-hexyl acrylate, 2-ethylhexyl acrylate, heptyl acrylate, n-octyl acrylate, 2-octyl acrylate, dodecyl methacrylate, dodecyl acrylate, tridecyl methacrylate, methacrylic ester and mixtures thereof.

In embodiments, polyurethane polymer (PU) is used in the dispersion base, instead of or in addition to the acrylic dispersion. PU is a reaction product of an organic polyisocyanate with an organic compound containing isocyanate-reactive groups, and a polyol. Polyisocyanates are compounds having two or more isocyanate groups per molecule. Suitable isocyanates are aliphatic or aromatic diisocyanates. Examples of suitable aliphatic diisocyanates include hexamethylene diisocyanate, isophorone diisocyanate, cyclohexane-1,4 diisocyanate, 4,4'-dicyclohexylmethane diisocyanate, trimethyl-1,6 diisocyanatohexane and m-tetramethylxylene diisocyanate. In embodiments, the polyols is used to prepare a polyurethane-based polymer such as the polyurethane prepolymer includes glycols, polyether polyols, polyester polyols, copolymers, and combinations thereof.

In embodiments, the dispersion base is a hybrid system having both acrylic and polyurethane components combined to form a single product. In embodiments, the acrylic polymer is modified with an aliphatic polyurethane polymer in aqueous dispersion/solution. The hybrid system contains different proportions of the acrylic and polyurethane components. In embodiments, the polyurethane component concentration is 5-85 wt. % of the total weight, or 7-75 wt. %, or 10-50 wt. %, or 10-30 wt. %, with the acrylic polymer as the remainder.

It should be noted that other polymer dispersion bases can be used instead of or in addition to acrylic/polyurethane dispersions, e.g., dispersions based on SBR resins (styrene-butadiene rubber), modified SBR, polychloroprene resins, 2-chlorobutadiene, SA resins (styrene-acrylics), NBR resins (nitrile-butadiene rubber), aqueous polyesters, polydimethylsiloxane (PDMS), vinyl acetate (VA)-vinyl versatate, and mixtures thereof.

In embodiments, the amount of dispersion component, e.g., acrylic dispersion, polyurethane compounds, hybrid systems, or other polymer dispersions, in the coating composition ranges from 10-90 wt. %, or 15-85 wt. %, or 20-75 wt. %, or <70 wt. %, based on the total weight of the coating composition.

Optional Coalescent Agent/Co-solvent: In embodiments, the coating composition further comprises a coalescent agent and/or co-solvents, which aid in film formation during drying. Examples include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, dipropylene glycol n-butyl ether (DPnB), texanol ester alcohol, N-methylpyrrolidone (NMP), functionalized fatty acid esters or a blend of diethal esters of adipic, glutaric, and succinic diacids or di-octyl succinate or trimethylpentanediol monoisobutyrate or 2,2,4-trimethyl-1,3-pentanediol diisobutyrate or dipropylene glycol-n-butyl ether, vegetable oils, animal oils, and mixtures thereof.

The coalescent agent and/or co-solvent is used in an amount of <10 wt. %, or 0.5-10 wt. %, or 1-10 wt. %, or 2-8 wt. %, or <5 wt. %, based on the total weight of the coating composition.

Optional Components: In embodiments, the coating composition further comprises at least one of fillers, pigments, and combinations thereof. Examples of fillers include calcium carbonate, sand, talc, fibers, heavy spar, and mixtures thereof. Examples of pigments include inorganic pigments such as titanium dioxides (rutile, anatase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide (lithopones), cadmium mercury mixtures, cadmium sulfide or cadmium sulfoselenides, nickel and titanium dioxide mixtures, sodium, potassium or ammonium coordination compounds of ferri-ferrocyanide, ultramarine blues (a calcined mixture of china clay, sodium carbonate, silica, sulfur and reducing agents), cobalt aluminate (cobalt blues), chromium oxide, metal flake pigments such as aluminum, zinc, copper, bronze powders, metal silver pigments, pearlescent and iridescent flakes of basic lead carbonates, bismuth oxychlorides and titanium coated mica, etc.

Optional additives can be added to the coating composition for various intended purposes, at a concentration sufficient to prepare the coating composition with minimal impact to the properties of the composition.

Examples of optional additives include pH modifying agents, biocides, co-solvents and plasticizers, crosslinking agents, dispersing agents, rheology modifiers, wetting and spreading agents, leveling agents, adhesion promoters, anti-blocking agents, anti-freezing agents, corrosion inhibitors, anti-static agents, flame retardants and intumescent additives, dyes, optical brighteners and fluorescent additives, UV absorbers and light stabilizers, chelating agents, flatting agents, flocculants, humectants, insecticides, lubricants, odorants, oils, waxes and slip aids, soil repellants, stain resisting agents, and combinations thereof.

Examples of pH modifying agents include bases such as sodium hydroxide, potassium hydroxide, amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof.

In embodiments, optional additives are added in an amount of up to 70 wt. %, or 0.01-65 wt. %, or 0.5-60 wt. %, or 1-50 wt. %, or >2 wt. %, based on the total weight of all of the components present in the coating composition.

Process for Preparing the Coating Composition: The coating composition is prepared by mixing or dispersing acrylic, polyurethane, acrylic-polyurethane hybrid dispersions, or other polymeric dispersions in the DCR or vice versa, and optional components at a temperature enabling an effective coating composition. Components in the coating composition can be mixed in any order to provide dispersion formulations. Any of the optional components can also be added to the composition during the mixing or prior to the mixing to form the coating composition. In embodiments, a hardener is added to the composition at the time of application by the end-user to improve the durability of the coated film.

In embodiments, the coating composition is prepared by first adding acrylic and/or polyurethane dispersion(s) in a mixing vessel. Optional additives, e.g., defoamer and surface additives are added under continuous stirring and the reaction mixture is then allowed to disperse. To the stirring solution, a pre-mixed/pre-blend of coalescent agent and water is added until a homogeneous mixture is formed.

Applications: The coating composition can be applied to a substrate or a surface and allowed to dry to form a coating layer (e.g., as a film). The coating composition can be applied by any suitable coating technique, e.g., spraying, rolling, brushing, or spreading. Coating compositions can be applied in a single coat, or in multiple sequential coats (e.g., in two coats or in three coats) as required. Generally, the coating composition is allowed to dry under ambient conditions. In certain embodiments, the coating composition can be dried, e.g., by heating and/or by circulating air over the coating.

Properties: The coating compositions exhibit improved film appearance, gloss, and hardness.

In embodiments, the coating composition has a weight-average particle diameter of $>1$ nm$^4$, or $>10$ nm$^4$, or $>20$ nm$^4$, or $>30$ nm$^4$, or $>50$ nm$^4$, or $>60$ nm$^4$, or $>70$ nm$^4$, or $<80$ nm$^4$, as determined by a Beckman Coulter LS 13320 Particle Size Analyzer.

Examples: The following illustrative examples are non-limiting.

The following test methods are employed:

Flow behavior of acrylic and PU formulations (dispersions) is observed in a Solution Flowability Test by casting a coating composition onto a substrate to form a film, and observing the film sample as to flow characteristics, e.g., low, medium, and highly viscous.

Drying Time Test is conducted according to ISO 9117-5 standard on films having thickness of 10-200 m, or 25-150 m, or 30-135 m, or 40-125 m, or 50-115 m, or 65-100 m, or 75-95 m, measuring the drying time of the film at a certain temperature over a period of time.

Hardness test on dry film is conducted on film using the Persoz Pendulum hardness test. This test is carried out according to standard NFT 30-016. The test is carried out on coating films having thickness of 10-200 m, or 25-150 m, or 30-135 m, or 40-125 m, or 50-115 m, or 65-100 m, or 75-95 m (paint in the wet state) to glass panels using an applicator of calibrated thickness. The characterization principle is to measure the damping time of a pendulum resting, via two steel balls, on the film.

The components used in the examples include:

DCR oil from Kraton Corporation having the properties shown in Table 1 was used for the examples, which also has the properties: $O_2$ of 0.39; % tricyclic compounds of 74.9; % aromatic MW 252 of 12.3; reactive double bond MW 254 of 0.1; aromatic MW 256 of 45.9; reactive double bond MW 258 of 0.2; cycloaliphatic MW 262 of 16.0.

TABLE 1

| Properties of DCR | | |
|---|---|---|
| Property | Method | Properties |
| Viscosity, cSt @ 40° C. | ASTM D445 | 32.4 cSt |
| Density at 20° C. | ASTM D1480 | 0.96 g/cm³ |
| Viscosity Index | — | −179 |
| Color | ASTM D6166 | 1-2 Gardner |
| Flash Point, COC | ASTM D92 | 158° C. |

TABLE 1-continued

| Properties of DCR | | |
|---|---|---|
| Property | Method | Properties |
| Pour Point | ASTM D97 | −24° C. |
| Aniline Point | ASTM D611 | 15° C. |
| Sulfur | ASTM D5453 | <0.01% |
| Boiling Point Range | ASTM D2887 | 235-360° C. |
| Acid # (carboxylic acid) | ASTM D465 | <5 mg KOH/g |
| Aromatic Content (%) | ASTM D2140 | 32 |
| Naphthenic Content (%) | ASTM D2140 | 46 |
| Paraffinic Content (%) | ASTM D2140 | 22 |
| Kinematic viscosity 40° C. | ASTM D445 | 32.4 cst |
| Paraffinic Content (%) | ASTM D2140 | 22 |

PLEXTOL™ D2610, is an aqueous dispersion of an acrylic copolymer, having a solid content of 48%, pH of 7.7, viscosity at 25° C. of 450 mPas, MFTT of 25° C. and Tg of 25° C.

PLEXTOL™ A6604, is an aqueous dispersion of an acrylic copolymer having Tg>25° C.

Alberdingk™ U9900 is an aqueous, anionic, solvent-free dispersion of an aliphatic polyester-polyurethane with a solid content of 39-41%, pH of 7.5-9, viscosity at 25° C. of 20-200 mPas, MFFT of 50° C., the density of 1.06 g/cm³, and pendulum hardness (film) 160 s.

Dowanol™ DPM, is a dipropylene glycol methyl ether, having molecular weight 148.2 (g/mol), BP of 190° C., flash point of 75° C.

Examples 1-5: A number of acrylic-based coating compositions are made according to the formulations in Table 2. The acrylic dispersion for all examples is a blend of PLEXTOL D2610 and PLEXTOL A6604 in a ratio of 1:4, in an amount of 100 g as the dispersion base. The blend also contains a defoamer (0.5 wt. %) and a surfactant (0.2 wt. % Byk 333). Butyl glycol: water 1:1 mixture and a mixture of coalescent agent (DCR and/or dibutyl phthalate) and water is added next, forming a homogeneous mixture.

TABLE 2

| Example | Sample Code | Dibutyl phthalate (g) | DCR (g) | Water (g) | Butylglycol:Water (1:1) (g) | Coalescent replacement |
|---|---|---|---|---|---|---|
| 1 | BiA1 | 2 | — | — | 24 | — |
| 2 | BiA2 | — | 2 | — | 24 | 16% |
| 3 | BiA3 | — | 3.5 | 1.5 | 21 | 25% |
| 4 | BiA4 | — | 7 | 5 | 14 | 50% |
| 5 | BiA5 | — | 14 | 12 | 0 | 100% |

The samples were subjected to Solution Flowability Test and observed for appearance, before casting onto a glass substrate to form a film. The samples BiA1-BiA3 are viscous with a smooth glossy appearance. Sample BiA4 has low viscosity and the film casted from BiA4 is inhomogeneous.

The samples are cast forming films. The casting is done by applying the samples using a 75-micron film applicator onto a 1.2-millimeter glass substrate forming films having a thickness of 20-35 μm. The film is allowed to dry for 90 minutes, then scratched with a wood tongue depressor. MFFT is reported at the point of some resistance to the scratching. Visual MFFT is also noted as the bar temperature at which the film is still continuous, and no discontinuity is evidenced by the whitening, cracking or both. The results are summarized in Table 3.

TABLE 3

| Sample Code | Solution Flowability | Appearance of film on the glass | MFFT (° C.) |
|---|---|---|---|
| BiA1 | Medium viscous | Smooth glossy | −2.5 |
| BiA2 | Highly viscous | Smooth glossy | −2.5 |
| BiA3 | Medium viscous | Smooth glossy | +6.0 |
| BiA4 | Low viscous | Inhomogeneous | 17.0 |
| BiA5 | Phase separation | — | — |

The samples are also tested for Persoz Pendulum hardness. Results are shown in Table 4.

TABLE 4

| Sample reference | DFT (μm) | After 1 day (%) | After 7 days (%) | After 28 days (%) | Scale |
|---|---|---|---|---|---|
| BiA 1 | 30 | 30.3 | 45.0 | 53.8 | 100% = glass |
| BiA 2 | 30 | 30.0 | 44.3 | 53.0 | |
| BiA 3 | 30 | 24.3 | 34.7 | 44.6 | |
| BiA 4 | 30 | 21.6 | 26.7 | 31.1 | |

Film samples having a thickness (DFT) of 30 m are tested to measure drying time before certain desired results (e.g., Degree I-V). Results are shown in Table 5.

TABLE 5

| Sample reference | DFT (μm) | Degree I (min) Dust free | Degree II (min) Tack free | Degree III (min) | Degree IV (min) Hard dry time | Degree V (h) |
|---|---|---|---|---|---|---|
| BiA 1 | 30 | 5 | 10 | 12 | 25 | 2.0 |
| BiA 2 | 30 | 6 | 12 | 15 | 25 | 3.3 |
| BiA 3 | 30 | 5 | 10 | 12 | 30 | 3.5 |
| BiA 4 | 30 | 7 | 12 | 13 | 30 | 4.0 |

Examples 6-10: A number of polyurethane-based coating compositions are made according to the formulations in Table 6. The polyurethane dispersion for all examples is Alberdinkg U9900 in an amount of 100 g as the dispersion base, which also contains a defoamer (0.5 wt. % Byk 028) and a surfactant (0.2 wt. % Byk 333). Butyl glycol: water 1:1 mixture and a mixture of coalescent agent (DCR and/or Dowanol DPM) and water are added next, forming a homogeneous mixture. Samples are formed using the same procedures as examples 1-5.

TABLE 6

| Example | Sample Code | Dowanol DPM (g) | DCR (g) | Water (g) | Butylglycol:Water (1:1) (g) | Coalescent replacement |
|---|---|---|---|---|---|---|
| 6 | BiP1 | 6 | — | — | 12 | — |
| 7 | BiP2 | 3 | 3 | — | 12 | 25% |
| 8 | BiP3 | — | 6 | — | 12 | 50% |
| 9 | BiP4 | — | 9 | 3 | 6 | 75% |
| 10 | BiP5 | — | 12 | 6 | 0 | 100% |

The samples are further subjected to Solution Flowability Test, MFFT, and observed for appearance. Results are summarized in Table 7.

TABLE 7

| Sample Code | Solution Flowability | Appearance of film on the glass | MFFT (° C.) |
|---|---|---|---|
| BiP1 | Medium Viscous | Smooth glossy | −3.3 |
| BiP2 | Medium Viscous >BiP1 | Smooth, low haze | −2.5 |
| BiP3 | Highly viscous | Smooth, haze | +7 |
| BiP4 | Light phase separation | Wrinkled | >+33 |
| BiP5 | Phase separation | disintegrated | — |

The samples are also tested for hardness. Results are shown in Table 8.

TABLE 8

| Sample reference | DFT (μm) | After 1 day (%) | After 7 days (%) | After 28 days (%) | Scale |
|---|---|---|---|---|---|
| BiP 1 | 30 | 60.6 | 74.0 | 76.9 | 100% = glass |
| BiP 2 | 30 | 57.8 | 70.4 | 75.2 | |
| BiP 3 | 30 | 50.3 | 58.8 | 66.8 | |
| BiP 4 | 25 | 22.1 | 37.8 | 42.5 | |

Film samples having a thickness (DFT) of 25-40 m are tested to measure drying time before certain desired results (e.g., Degree I-V). Results are summarized in Table 9.

TABLE 9

| Sample reference | DFT (μm) | Degree I (min) Dust free | Degree II (min) Tack free | Degree III (min) | Degree IV (min) Hard dry time | Degree V (h) |
|---|---|---|---|---|---|---|
| BiP 1 | 40 | 40 | 50 | 60 | 70 | 7-24 |
| BiP 2 | 40 | 40 | 50 | 60 | 70 | 7-24 |
| BiP 3 | 40 | 35 | 45 | 55 | 65 | 7 |
| BiP 4 | 25 | 35 | 40 | 55 | 65 | 2.5 |

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A coating composition comprising:
   10-90 wt. % of a dispersion polymer selected from acrylic polymers, polyurethane polymers, and mixtures thereof;
   2-20 wt. % of a decarboxylated rosin acid (DCR) having a density of 0.9 to 1.0 g/cm$^3$, a flash point of 135 to 175° C., an acid value of less than 50 mg KOH/g, measured according to ASTM D465, and a viscosity of 15 to 60 cSt at 40° C., measured according to ASTM D-445;
   0-70 wt. % of at least one of a filler, pigment, and combinations thereof;
   wherein the coating composition forms a film upon coating a substrate, and wherein the film has an average thickness of 10 μm to 200 μm and a minimum film formation temperature (MFFT) from −5 to 60° C., measured according to ASTM D2354.

2. The coating composition of claim 1, wherein the DCR comprises: one or more C=C groups; and 40 to 100 wt. % of tricyclic compounds having 18 to 20 carbon atoms.

3. The coating composition of claim 2, wherein sum of tricyclic compounds as aromatic and cycloaliphatic in the DCR is greater than 50 wt. %, based on the total weight of the DCR.

4. The coating composition of claim 2, wherein amount of the tricyclic cycloaliphatic compounds in the DCR is greater than 15 wt. %, based on the total weight of the DCR.

5. The coating composition of claim 1, wherein the DCR has:
   an aromatic content of 30-60 wt. %,
   a naphthenic content of 40-60 wt. %, and
   a paraffinic content of 20-35 wt. %, based on the total weight of the DCR.

6. The coating composition of claim 1, wherein the DCR has at least one of: a density of 0.92 to 0.98 g/cm$^3$; an acid value of 0.4 to 40 mg KOH/g; and a flash point of 140 to 175° C.

7. The coating composition of claim 1, wherein the DCR has a sulfur content of less than 0.05 wt. % based on the total weight of the DCR, measured according to ASTM D5453.

8. The coating composition of claim 1, wherein the DCR has at least one of: an aniline point of 3 to 40° C., measured according to ASTM D611; a pour point of −40 to 10° C., measured according to ASTM D97; and a boiling point of 235 to 360° C., measured according to D2887.

9. The coating composition of claim 1, wherein the DCR has at least one of: a Gardner Color of 0 to 12.0, measured according to ASTM D6166.

10. The coating composition of claim 1, wherein the DCR has at least one of: a volatile organic compound (VOC) of less than 5 wt. % based on the total weight of the DCR;
    and a Kauri butanol (Kb) value of 25 to 90, measured according to ASTM D1133.

11. The coating composition of claim 1, wherein the DCR has a surface tension of 25 to 50 dynes/cm, measured according to ASTM D1331.

12. The coating composition of claim 1, wherein the DCR has a Brookfield viscosity of 20-50cSt at 40° C.

13. The coating composition of claim 1, wherein the dispersion polymer is an acrylic copolymer or an acrylic polymer, wherein the substrate is glass, and wherein the film has a hardness of 30% after 1 day, 45% after 7 days, and 55% after 28 days, measured according to NFT 30-016 standard.

14. The coating composition of claim 13, wherein the dispersion polymer is an acrylic copolymer comprising a mixture of monomers selected from the group consisting of:
   (a) 20 to 80% by weight of one or more acrylic and/or methacrylic acid esters, whose homopolymers have a glass transition temperature Tg of greater than 25° C., and
   (b) 20 to 80% by weight of one or more acrylic and/or methacrylic acid esters B whose homopolymers have a glass transition temperature Tg of less than 25° C.

15. The coating composition of claim 1, wherein the dispersion polymer is polyurethane, the polyurethane is a reaction product of a polyisocyanate containing isocyanate-reactive groups and a polyol, and wherein:
   the polyisocyanate is selected from aliphatic diisocyanates and aromatic diisocyanates;
   the polyol is selected from glycols, polyether polyols, polyester polyols, copolymers and combinations thereof.

16. The coating composition of claim 1, wherein the dispersion polymer is polyurethane, wherein the substrate is glass, and wherein the film has a hardness of 60% after 1 day, 74% after 7 days, and 80% after 28 days, measured according to NFT 30-016 standard.

17. The coating composition of claim 1 further comprising 0.5-10 wt. % of at least a coalescent agent, based on the total weight of the coating composition.

18. The coating composition of claim 17, wherein the coalescent agent is selected from the group consisting of ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, dipropylene glycol n-butyl ether (DPnB), texanol ester alcohol, N-methylpyrrolidone (NMP), functionalized fatty acid esters or a blend of diethal esters of adipic, glutaric, succinic diacids or di-octyl succinate or trimethylpentanediol monoisobutyrate or 2,2,4-trimethyl-1,3-pentanediol diisobutyrate or dipropylene glycol-n-butyl ether, vegetable oils, animal oils, and mixtures thereof.

19. The coating composition of claim 1 further comprises at least an additive selected from the group consisting of pH modifying agents, biocides, co-solvents, plasticizers, cross-linking agents, dispersing agents, rheology modifiers, wetting and spreading agents, leveling agents, adhesion promoters, anti-blocking agents, anti-freezing agents, corrosion inhibitors, anti-static agents, flame retardants, intumescent additives, dyes, optical brighteners and fluorescent additives, UV absorbers and light stabilizers, chelating agents, flatting agents, flocculants, humectants, insecticides, lubricants, odorants, oils, and mixtures thereof.

20. The coating composition of claim 19, wherein the additive is present in amounts of up to 30 wt. %, based on the total weight of the coating composition.

* * * * *